United States Patent Office 2,890,978
Patented June 16, 1959

2,890,978
PAPER OF HIGH DRY STRENGTH AND LOW WET STRENGTH

Norman T. Woodberry, Sewell T. Moore, and Yun Jen, Stamford, Conn., assignors to American Cyanamid Company, New York, N.Y., a corporation of Maine No Drawing. Application October 2, 1957
Serial No. 687,619

8 Claims. (Cl. 162—168)

The present invention relates to paper of substantially improved dry strength but substantially unimproved wet strength and includes the treated cellulose fibers themselves, with and without applied sizing material, and water-laid fibrous cellulosic webs prepared therefrom such as paper board, shaped pulp articles and the like. The invention includes methods for manufacturing such paper by addition of synthetic resins as hereinafter defined to beater pulp.

It is known that paper of improved dry strength results when appropriate ionic resins are added prior to the sheeting step, so that the fibers are bonded together by an adsorbed or precipitated content of the resin. However, such resins generally impart substantial wet strength as well. Wet strength is unnecessary in the use of letter paper, book paper and newsprint, and in such papers is undesired because it renders the pulping of broke and scrap more difficult.

It is further known that polyacrylamide and similar polymeric amides can be converted into a cationic resin which produces paper of very satisfactory wet and dry strength when added to the beater pulp. Such resins are prepared by the Hofmann degradation whereby amide groups are converted to amine groups by reaction with alkali metal hypohalites in aqueous alkaline solution; see House et al. U.S. Patent No. 2,729,560, granted January 3, 1956. According to that patent at least 20% of the amide groups of the resin are degraded to amine groups, so that the proportion of amine groups to amide groups in the ultimate polymer is more than 1:4.

The discovery has now been made that paper having substantially improved dry strength and virtually no wet strength can be prepared by forming an aqueous suspension of cellulose papermaking fibers, uniformly distributing therethrough a small amount of a polymer prepared by subjecting a water-soluble polyacrylamide to the Hofmann reaction until at least about 0.1% (but not more than about 15%) of the amide groups therein have been degraded to amine groups, (so that the ratio of amine groups to amide groups is between about 1:1000 and 1:7), sheeting the fibers to form a water-laid web, and drying the web. The drying step referred to forms a polymer bond between the fibers. The polymers referred to are thermoplastic but evidently combine with the cellulose molecule in some way as the dry-strength values obtained are generally higher when the wet web is dried in the range of 200°–250° F. than at room temperature.

It is a particular advantage of the invention that even though the amine content of the resin is comparatively low the polymer is cationic and is rapidly and substantively adsorbed by the paper fibers without need for precipitants.

It has long been known that the addition of rosin size and alum to beater pulp paper results in the development of paper of very considerably decreased dry strength. Typically the addition of 1.5% of rosin size (based on the dry weight of the fibers) together with sufficient alum to cause precipitation causes a decrease of 5% to 10% in the dry strength of the paper. It is an important feature of the invention that this detrimental weakening action can be completely counteracted by the addition of polymer without more than insignificant detriment to the sizing. As a result, it now becomes possible to manufacture rosin size paper having the high dry strength and negligible wet strength of paper which has not been sized at all.

The polymers of the present invention are added to beater pulp, etc., in amounts between 0.1% and 5% based on the dry weight thereof, depending on the dry strength desired. The economic range extends between about 0.5% and 1.5%, where the amount of dry strength imparted per increment of polymer added is greatest, and in this range, by use of preferred polymers we have regularly found it possible to increase the dry strength of the paper by between 15% and 25%. The wet strength of paper thus obtained, at ordinary book paper weight, has been less than 2 lb. per linear inch, a negligible value. Such paper can be repulped in ordinary beater equipment and does not require treatment with steam jets or chemicals; as respectively shown in U.S. Patent No. 2,423,097 and House et al. copending application Serial No. 533,259, filed on September 8, 1955.

The resins of the present invention may be applied at any customary point in the papermaking system ahead of the wire. To facilitate metering the polymers are preferably added as aqueous solution of 5%–10% strength, and preferably also are added in the presence of alum which appears to assist adsorption of the polymer.

The polymers used in practicing the present invention are prepared from water-soluble polyacrylamides, i.e., substantially linear aliphatic carbon chain polymers having unsubstituted carboxamide groups directly attached thereto. Suitable examples include polyacrylamide itself, polymethacrylamide, polyethylacrylamide, and copolymers of water-soluble acrylamides with water-soluble amides copolymerizable therewith, e.g., maleamide and crotonamide, with or without minor amounts of non-ionic inert diluent material such as styrene or acrylonitrile. Because of their ready availability, the ease with which they undergo the Hofmann reaction and the very satisfactory results they afford, we prefer polyacrylamide and polymethacrylamide.

The above described starting materials exist at molecular weights ranging very low to values very high that the polymer is impractically difficult to pump even when extensively diluted with water. We have found that the development of a substantial part of the dry strength potentialities of the degradation product requires that the polymer raw material have a molecular weight of at least about 10,000. We have further found that the little improvement in dry strength results when the molecular weight of the polymer is increased above about 100,000. Thus while degradation products suitable for use in the present invention can be prepared from polymer raw material having a molecular weight over about 10,000, polymers having a molecular weight in the range of about 50,000–500,000 are preferred as such polymers develop about maximum dry strength while having a sufficiently fluid viscosity easily to be handled.

The polymers used in the present invention are produced by subjecting a polyacrylamide as disclosed above to the action of alkali metal hypohalites in aqueous alkaline solution, whereby a small proportion of the carboxamide groups of the polymer raw material are converted into amine groups. This conversion is known as the Hofmann degradation; the proportion of carboxamides degraded is controlled by the amount of hypohalite employed. In general one mol of alkali metal hypohalite in one mol of caustic medium will effect the conversion or degradation of approximately one equivalent of the amide group. We have found that conversion of at least about 0.01% of the amide groups to amine form is necessary to render the polymer molecule as a whole cationic and cellulose substantive and that substantially no wet strength develops so long as the percent of groups converted is not in excess of about 15%.

The degradation reaction proceeds swiftly from 0° C. to 50° C. and is self-terminating by consumption of the hypohalite. Prompt cooling to room temperature is generally advantageous as holding to a minimum the carboxyl groups formed by hydrolysis of the amine groups.

The reaction product is preferably separated from the alkaline reaction mixture by neutralizing the solution with an acid. Suitable acids that may be used to neutralize the solution are such as hydrochloric, sulfuric, phosphoric, etc. During the addition of the acid to the mixture, carbon dioxide is evolved. After the reaction product has been separated it may be hardened by soaking in a water-soluble organic solvent such as, for example, methanol, ethanol, propanol, acetone, dioxane, etc. Inasmuch as the reaction product is water-soluble, it is necessary to maintain an excess amount of said solvent when a water-solvent mixture is used.

The aminoaliphatic chain polymer resins, prepared as described above, can be applied to paper or other felted cellulosic products by tub application methods if desired. Thus, for example preformed and completely or partially dried paper prepared from a chemical pulp such as sulfite pulp or sulfate pulp or a mechanical pulp such as groundwood or any mixture thereof may be immersed in or sprayed with a 1% to 5% aqueous solution or dispersion of the resin and impregnated with about 50-100% thereof based on the weight of the paper. The paper is then dried by heating for about 0.1 to 5 minutes at temperatures of 212°-300° F., or for shorter times at higher temperatures, whereby the paper is dried and resin-bonding of the fibrils thereof is developed.

The preferred process of our invention, however, takes advantage of the substantive properties of the Hofmann degraded polymer resins for hydrated cellulosic fibers. These resins are hydrophilic in character, i. e., they are water soluble or water-dispersible under the conditions normally used in preparing paper furnishings and yet they deposit selectively by adsorption on the fibers in the suspension. Accordingly, the polymer may be dissolved in an aqueous suspension of the cellulose fibers or may be pre-dissolved and added thereto as an aqueous solution.

The pH of the pulp suspension at the point of addition of the polymer is not critical and may be any value between about 4 and 9 so that the process tolerates the presence of alkaline reacting fillers such as calcium carbonate. Optimum strength is generally developed between about 4.5 and 7.5 so that if desired the process may be performed wholly on the alkaline side.

The invention will be further described by the following specific examples. These examples represent preferred embodiments of the invention and are not to be construed as limitation thereon. Parts are by weight unless otherwise stated. The manner in which the adsorbed polymer is present on the fibers and the mode whereby it cooperates with the fiber to produce dry strength without wet strength is not known, so that the paper is described by its process of manufacture.

RESIN A

To 355 parts (1 mol) of a 20% aqueous polyacrylamide solution (estimated molecular weight 50,000) there is added slowly over 20 minute period a mixture of 40 parts of 5.25% sodium hypochlorite (0.03 mol) and 2.3 parts (0.06 mol) of sodium hydroxide. The reaction is exothermic and the temperature increased from 30° C. to 37° C°. during the addition. The batch is allowed to react for an additional period of 30 minutes at 37° C. and then neutralized with 11 parts of 18% aqueous hydrochloric acid. The final pH is 6.9. The resin formed a white precipitate upon the addition of polyacrylic acid solution, indicating the resin is cationic. The resin was found to contain 0.2% amino nitrogen. This corresponds to 1% vinyl amine units in the polymer.

RESIN B

The process for Resin A is repeated using 150 parts of sodium hypochlorite solution and 9 parts of sodium hydroxide. About 5% of the amide groups are degraded to —$NH_2$ groups.

RESIN C

The process for Resin A is repeated using 300 parts of sodium hypochlorite solution and 18 parts of sodium hydroxide. About 10% of the amide groups are degraded to —$NH_2$ groups.

RESIN D

To 394 parts (one mol of acrylamide units) of a 20% aqueous solution of a 90%-10% acrylamide-styrene copolymer having an estimated molecular weight of 100,000 is slowly added over 20 minutes a mixture of 40 parts of 5.25% sodium hypochlorite (0.03 mol) and 2.3 parts 0.06 mol of sodium hydroxide. The temperature is maintained between 30°-37° C. for an additional 30 minutes and is then neutralized with 18% aqueous hydrochloric acid. It was found by analysis that 0.9% of the amide groups had been degraded to amine groups.

RESINS E-F

The polymer employed for the preparation of Resin D was degraded by the method shown above converting 5% (Resin E) and 10% (Resin F) of the amide groups to amine groups.

RESIN G

Polymethacrylamide (estimated molecular weight 150,000) was treated according to the method used for the preparation of Resin B thereby converting 5% of the amide groups to amine groups.

RESIN H

A 90% acrylamide-10% acrylonitrile copolymer (estimated molecular weight 100,000) was degraded by the method used for the preparation of Resin D thereby converting 5% of the amide groups to amine groups.

*Examples*

The following illustrates application of the foregoing resins by the beater addition method to develop paper having improved dry strength but substantially unimproved wet strength.

For the tests aliquots were taken of laboratory master batches of well-beaten pulps as shown in the table below. The pulp aliquots were adjusted to the pH values shown in the table and to each was added 1% based on the dry weight of the fibers of one of the degraded polymers, also as shown in the table. The polymers were added in the form of 5% aqueous solutions. The aliquots were gently stirred for 3 minutes to permit the adsorption to go to equilibrium (equivalent to substantial completion). The suspensions were sheeted on a large handsheet machine at a basis weight of approximately 50 lb. per 25" x 40"/500 ream and the sheets dried for 2 minutes at 220° F. on a rotary drum drier. The sheets were then conditioned and dried and wet tensile strengths determined by the TAPPI methods.

Runs 13-17 were performed to illustrate the value of the present invention in counteracting the weakening effect of rosin size. In treating the suspensions, the size was added first, the alum next and the resin last, so as to duplicate paper-mill practice as closely as possible.

| Run | Polymer¹ | | | | Pulp | | Percent Alum² | Percent Rosin Size² | Tensile, Lb./In. | |
|---|---|---|---|---|---|---|---|---|---|---|
| | No. | Name | Percent—CONH₂ Degraded | Percent Added² | Name | pH | | | Dry | Wet |
| 1 | | Control | | None | Sulfite-soda | 5 | | | 16.5 | <0.6 |
| 2 | A | PAM | 1.3 | 1 | ---do--- | 5 | | | 17.3 | 0.8 |
| 3 | B | PAM | 5 | 1 | ---do--- | 5 | | | 19.4 | 1.2 |
| 4 | C | PAM | 10 | 1 | ---do--- | 5 | | | 19.1 | 1.0 |
| 5 | | Control | | None | Bl. no. kraft | 5 | | | 28.7 | <0.6 |
| 6 | D | 90% AM—10% STY | 0.9 | 1 | ---do--- | 5 | | | 31.3 | 0.6 |
| 7 | E | 90% AM—10% STY | 5 | 1 | ---do--- | 5 | | | 33.2 | 1.0 |
| 8 | F | 90% AM—10% STY | 10 | 1 | ---do--- | 5 | | | 32.1 | 0.9 |
| 9 | | Control | | None | ---do--- | 5 | | | 28.7 | |
| 10 | G | PMAM | 5 | 1 | ---do--- | 5 | | | 34.1 | |
| 11 | G | PMAM | 5 | 1 | ---do--- | 7 | | | 33.8 | |
| 12 | G | PMAM | 5 | 1 | ---do--- | 9 | | | 32.5 | |
| 13 | | Control | | None | Bl. so. kraft | 5 | | | 37.1 | |
| 14 | H | 90% AM—10% AN | 5 | 1 | ---do--- | 5 | | | 35.2 | |
| 15 | | Control | | None | Sulfite-soda | 5 | | | 17.0 | |
| 16 | B | PAM | 5 | 1 | ---do--- | 5 | | | 19.9 | |
| 17 | B | PAM | 5 | 1 | ---do--- | 5 | 1.5 | | 21.6 | |
| 18 | B | PAM | 5 | None | ---do--- | 5 | 1.5 | 1.5 | 15.4 | |
| 19 | B | PAM | 5 | 1 | ---do--- | 5 | 1.5 | 1.5 | 20.1 | |

¹ AM=acrylamide; AN=acrylonitrile; MAM=methacrylamide; P=polymerized; STY=styrene.
² Based on dry weight of fibers.

We claim:
1. A method of producing paper having substantially improved dry strength but substantially unimproved wet strength, which comprises forming an aqueous suspension of cellulose papermaking fibers, uniformly distributing therethrough between about 0.1% and 5%, based on the dry weight of the fibers, of a cationic water-soluble polymer prepared by subjecting a water-soluble polyacrylamide having an average molecular weight in excess of about 10,000 to the Hofmann reaction until between about 0.1% and 15% of the amide groups therein have been degraded to amino groups, whereby an effective amount of said polymer is adsorbed by said fibers as strengthening agent, forming said fibers into a water-laid web, and drying said web thereby forming a polymer bond between said fibers.

2. A process according to claim 1 wherein the polymer is prepared by subjecting polymethacrylamide to the Hofmann reaction.

3. A process according to claim 1 wherein the pH of the suspension during addition of the polymer is alkaline.

4. A process according to claim 1 wherein the molecular weight of the polyacrylamide is in excess of 100,000.

5. A process according to claim 1 wherein the ratio of CONH₂ to —NH₂ substituents is between about 85:1 and 85:5.

6. A process according to claim 1 wherein alum is added to the suspension as agent improving the effectiveness of the polymer.

7. Paper prepared according to the process of claim 1.

8. A method of producing paper having substantially improved dry strength but substantially unimproved wet strength, which comprises forming an aqueous suspension of cellulose papermaking fibers having a pH between about 4.5 and 9, adding thereto an aqueous solution containing between about 0.1% and 5%, based on the dry weight of the fibers, of a cationic polymer prepared by subjecting a water-soluble polyacrylamide having an average molecular weight between about 50,000 to 500,000 to the Hofmann reaction until between 0.5% and 5% of the amide groups therein have been degraded to amino groups, whereby an effective amount of said polymer is adsorbed by said fibers as strengthening agent, forming said fibers into a water-laid web, and drying said fibers at a temperature between 200° F. and 250° F. thereby forming a polymer bond between said fibers.

References Cited in the file of this patent

UNITED STATES PATENTS

| 2,661,309 | Azorlosa | Dec. 1, 1953 |
| 2,729,560 | House et al. | Jan. 3, 1956 |
| 2,767,089 | Renfrew | Oct. 16, 1956 |
| 2,776,951 | Melamed | Jan. 8, 1957 |
| 2,801,169 | Lundberg | July 30, 1957 |